US012769770B2

(12) United States Patent
Tu et al.

(10) Patent No.: US 12,769,770 B2
(45) Date of Patent: Oct. 20, 2026

(54) AGENT PROMPT GENERATION USING TOOL DESCRIPTION EMBEDDINGS

(71) Applicant: Microsoft Technology Licensing, LLC, Redmond, WA (US)

(72) Inventors: Mengdie Tu, Sunnyvale, CA (US); Chih Hui Wang, San Jose, CA (US); Anthony Tuan Anh Huynh, Dublin, CA (US); Mingqi Shen, San Mateo, CA (US); Wei Yang, Belmont, CA (US); Zane Tarafa Homsi, Vienna, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 18/756,384

(22) Filed: Jun. 27, 2024

(65) Prior Publication Data

US 2025/0321990 A1 Oct. 16, 2025

Related U.S. Application Data

(60) Provisional application No. 63/634,389, filed on Apr. 15, 2024.

(51) Int. Cl.
*G06F 16/24* (2019.01)
*G06F 16/3329* (2025.01)
*G06F 16/383* (2019.01)

(52) U.S. Cl.
CPC ........ *G06F 16/3329* (2019.01); *G06F 16/383* (2019.01)

(58) Field of Classification Search
CPC .... G06F 16/24; G06F 16/2453; G06F 16/635; G06N 20/00
See application file for complete search history.

(56) References Cited

U.S. PATENT DOCUMENTS 12,505,296 B2 * 12/2025 Schillace ................ G06F 40/30
12,517,936 B1 * 1/2026 Yates .................. G06F 16/3344
(Continued)

FOREIGN PATENT DOCUMENTS

WO 2021076305 A1 4/2021

OTHER PUBLICATIONS

International Search Report and Written Opinion received for PCT Application No. PCT/US2025/023771, mailed on Aug. 5, 2025, 17 pages.

*Primary Examiner* — Daniel Abebe
(74) *Attorney, Agent, or Firm* — NICHOLSON DE VOS WEBSTER & ELLIOTT LLP

(57) ABSTRACT

Methods, systems, and apparatuses include receiving, via a conversational interface, user input from a user of an online system. A user input embedding is generated for the user input. A vector store is retrieved including tool description embeddings. A similarity search is performed using the user input embedding and the tool description embeddings. A set of tool descriptions is determined using results of the similarity search. A prompt is generated using the set of tool descriptions and the user input. Machine learning agents are applied to the prompt to cause the machine learning agents to use tools associated with the set of tool descriptions. A response to the prompt is received, from the machine learning agents, in response to the machine learning agents using the tools. An output to the user input based on the response is sent, via the conversational interface, to the user of the online system.

20 Claims, 8 Drawing Sheets

(56) References Cited

U.S. PATENT DOCUMENTS

| | | | | |
|---|---|---|---|---|
| 2025/0181899 | A1* | 6/2025 | Ajmera ................ | G06N 3/0475 |
| 2025/0190449 | A1* | 6/2025 | Zhang ................... | G06F 16/288 |
| 2026/0023764 | A1* | 1/2026 | Madisetti ............ | G06F 16/3329 |

* cited by examiner

300

AGENT PROMPT GENERATION USING TOOL DESCRIPTION EMBEDDINGS

CROSS-REFERENCE TO RELATED APPLICATIONS

The present application claims the benefit under 35 U.S.C. § 119(e) of U.S. Provisional Patent Application Ser. No. 63/634,389 filed Apr. 15, 2024, which is incorporated herein by this reference in its entirety.

TECHNICAL FIELD

The present disclosure generally relates to machine learning, and more specifically, relates to prompt generation approaches to machine learning. The present disclosure is particularly related to, but in no way limited to, ways of allocating workload between machine learning agents or control of machine learning agents.

BACKGROUND ART

Machine learning is a category of artificial intelligence. In machine learning, a model is defined by a machine learning algorithm. A machine learning algorithm is a mathematical and/or logical expression of a relationship between inputs to and outputs of the machine learning model. The model is trained by applying the machine learning algorithm to input data. A trained model can be applied to new instances of input data to generate model output. Machine learning model output can include a prediction, a score, or an inference, in response to a new instance of input data. Application systems can use the output of trained machine learning models to determine downstream execution decisions, such as decisions regarding various user interface functionality. Machine learning algorithms may be used in machine learning agents which are automated computing entities.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
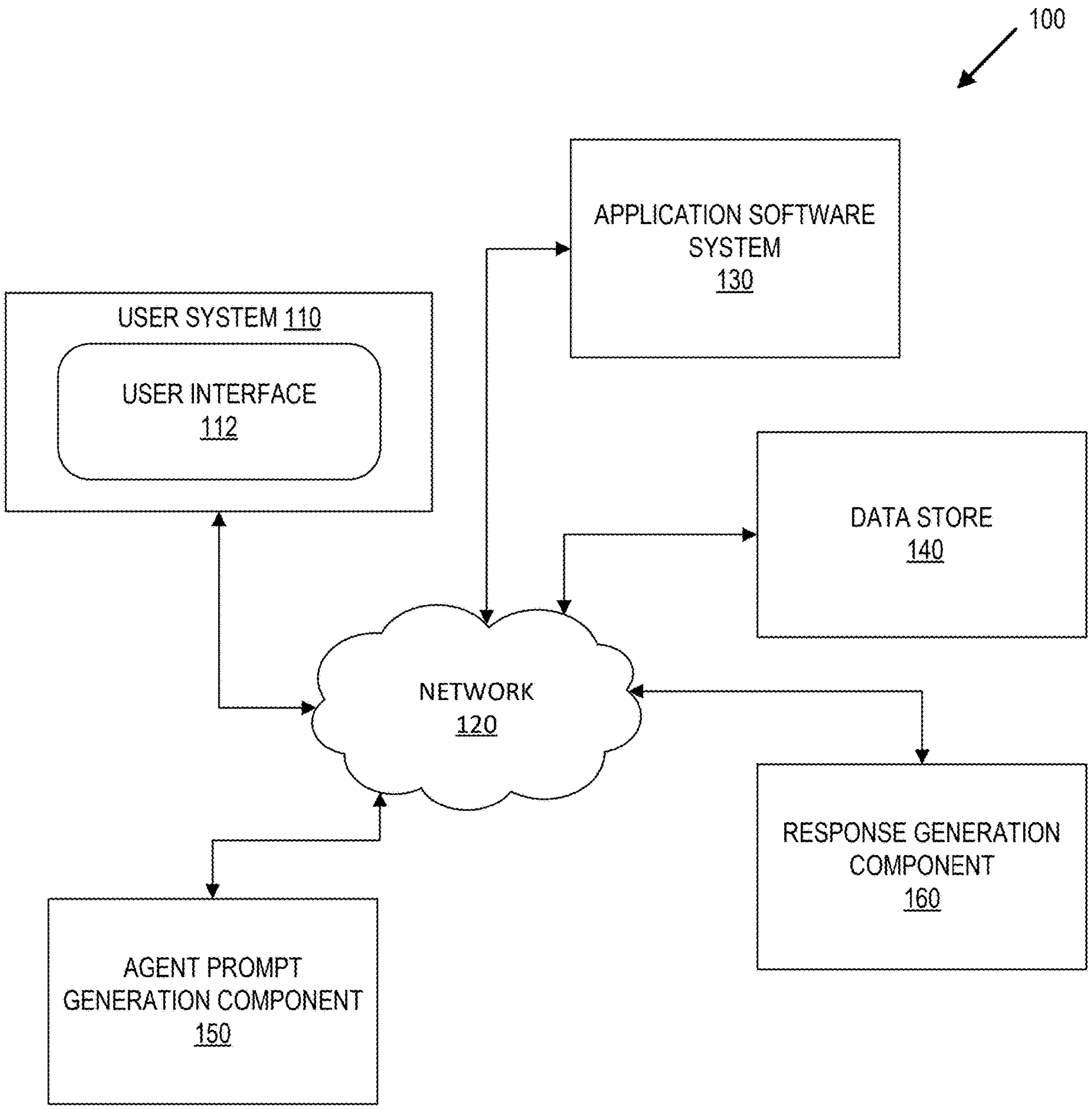
FIG. 1 illustrates an example computing system that includes an agent prompt generation component in accordance with some embodiments of the present disclosure.

Machine learning agents are automated machine learning models that can perform various tasks with autonomy. Machine learning agents may use tools to perform tasks. These tools include any automated function. For example, tools can include functions of application program interfaces (APIs) that are accessible by the machine learning agents. As machine learning systems grow and more and more tools are available to these agents, it becomes increasingly difficult for the agents to make appropriate decisions regarding what tools to use for each situation. This increases the amount of time machine learning agent systems take to generate responses and/or perform the appropriate tasks, reduces quality and accuracy of work products produced by agents, and decreases the overall throughput of systems comprising machine learning agent(s).

Shortcomings of agent machine learning systems are recognized herein such as where agent systems are implemented in environments where some information and/or tools are heterogeneous (e.g. more efficient, more specialized, more generalized, higher capacity, etc.) than others. For example, latency issues can arise because machine learning agents that cannot properly determine which tools to use to execute and/or respond to a given user input can take significantly longer to execute the requested actions and/or generate responses and/or may provide incorrect information.

An agent prompt generation system using tool description embeddings as described herein includes a number of different components that alone or in combination address the above and other shortcomings of machine learning agent systems, particularly when applied to environments with a large number of available tools. For example, by determining a set (where a set can be a plurality) of appropriate tools of the available tools using tool description embeddings and providing the set to the machine learning agents, the agent prompt generation system can generate agent prompts that reduce the amount of decision making (e.g., by simplifying the logic or decreasing the number of iterations or queries) required by the agent, thereby increasing the throughput of the entire system and reducing computing time.

Other technical problems relate to the ability to control an agent. For example, agents (whether physical or digital) can be configured to have some degree of independence (e.g., in terms of selecting tools to perform tasks or taking other actions). As such, there is a technical problem of how to give the agent guardrails to constrain the agent's actions (e.g., tool selection or other action) to viable options, safe options, human-centric options, or options meeting other criteria. Another technical problem is how to control an agent to achieve security or to achieve safety. In some implementations, prompt engineering can facilitate the control of an agent to improve security or safety. For example, the described approaches can restrict access to tools for certain agents and/or users, preventing unauthorized agents from accessing sensitive tools. The described approaches can also utilize sensor signals and/or performance metrics associated with computing resources such as processors, memory, and networks, to sense or observe latency, power use, round trip times, or other physical quantities, and incorporate such information into the prompt engineering strategies.

FIG. 1 illustrates an example computing system 100 that includes an agent prompt generation component 150 in accordance with some embodiments of the present disclosure. In the embodiment of FIG. 1, computing system 100 includes a user system 110, a network 120, an application software system 130, a data store 140, an agent prompt generation component 150, and a response generation component 160. Each of these components of computing system 100 are described in more detail below.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 130.

User interface 112 is any type of user interface as described above. User interface 112 can be used to input search queries and view or otherwise perceive output that includes data produced by application software system 130. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that includes or utilizes functionality and/or outputs provided by agent prompt generation component 150 and/or response generation component 160. Examples of application software system 130 include but are not limited to online services including connections network software, such as social media platforms, and systems that are or are not be based on connections network software, such as general-purpose search engines, content distribution systems including media feeds, bulletin boards, and messaging systems, special purpose software such as but not limited to job search software, recruiter search software, sales assistance software, advertising software, learning and education software, enterprise systems, customer relationship management (CRM) systems, or any combination of any of the foregoing.

A client portion of application software system 130 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

While not specifically shown, it should be understood that any of user system 110, application software system 130, data store 140, agent prompt generation component 150, and response generation component 160 includes an interface embodied as computer programming code stored in computer memory that when executed causes a computing device to enable bidirectional communication with any other of user system 110, application software system 130, data store 140, agent prompt generation component 150, and response generation component 160 using a communicative coupling mechanism. Examples of communicative coupling mechanisms include network interfaces, inter-process communication (IPC) interfaces and application program interfaces (APIs).

Data store 140 can include any combination of different types of memory devices. Data store 140 stores digital data used by user system 110, application software system 130, agent prompt generation component 150, and/or response generation component 160. In some embodiments, data store 140 includes memory for a user session. For example, data store includes in-session data for a user of user system 110. In-session data can include data relating to a user's interactions with user system 110 and/or application software system 130 during a single login period. Data store 140 can reside on at least one persistent and/or volatile storage device that can reside within the same local network as at least one other device of computing system 100 and/or in a network that is remote relative to at least one other device of computing system 100. Thus, although depicted as being included in computing system 100, portions of data store 140 can be part of computing system 100 or accessed by computing system 100 over a network, such as network 120.

Each of user system 110, application software system 13, data store 140, agent prompt generation component 150, and response generation component 160 is implemented using at least one computing device that is communicatively coupled to electronic communications network 120. Any of user system 110, application software system 130, data store 140, agent prompt generation component 150, and response generation component 160 can be bidirectionally communicatively coupled by network 120. User system 110 as well as one or more different user systems (not shown) can be bidirectionally communicatively coupled to application software system 130.

A typical user of user system 110 can be an administrator or end user of application software system 130, agent prompt generation component 150, and/or response generation component 160. User system 110 is configured to communicate bidirectionally with any of application software system 130, data store 140, agent prompt generation component 150, and/or response generation component 160 over network 120.

The features and functionality of user system 110, application software system 130, data store 140, agent prompt generation component 150, and response generation component 160 are implemented using computer software, hardware, or software and hardware, and can include combinations of automated functionality, data structures, and digital data, which are represented schematically in the figures. User system 110, application software system 130, data store 140, agent prompt generation component 150, and response generation component 160 are shown as separate elements in FIG. 1 for ease of discussion but the illustration is not meant to imply that separation of these elements is required.

The illustrated systems, services, and data stores (or their functionality) can be divided over any number of physical systems, including a single physical computer system, and can communicate with each other in any appropriate manner.

The agent prompt generation component 150 generates agent prompts including tool descriptions causing machine learning agents to execute the prompts using tools associated with the tool descriptions. Further details with regard to the operations of agent prompt generation component 150 are described below.

The response generation component 160 generates responses to user input based on the results of the machine learning agents executing the prompts using the tools associated with the designated tool descriptions. Further details with regard to the operations of response generation component 160 are described below.

Figure 2:
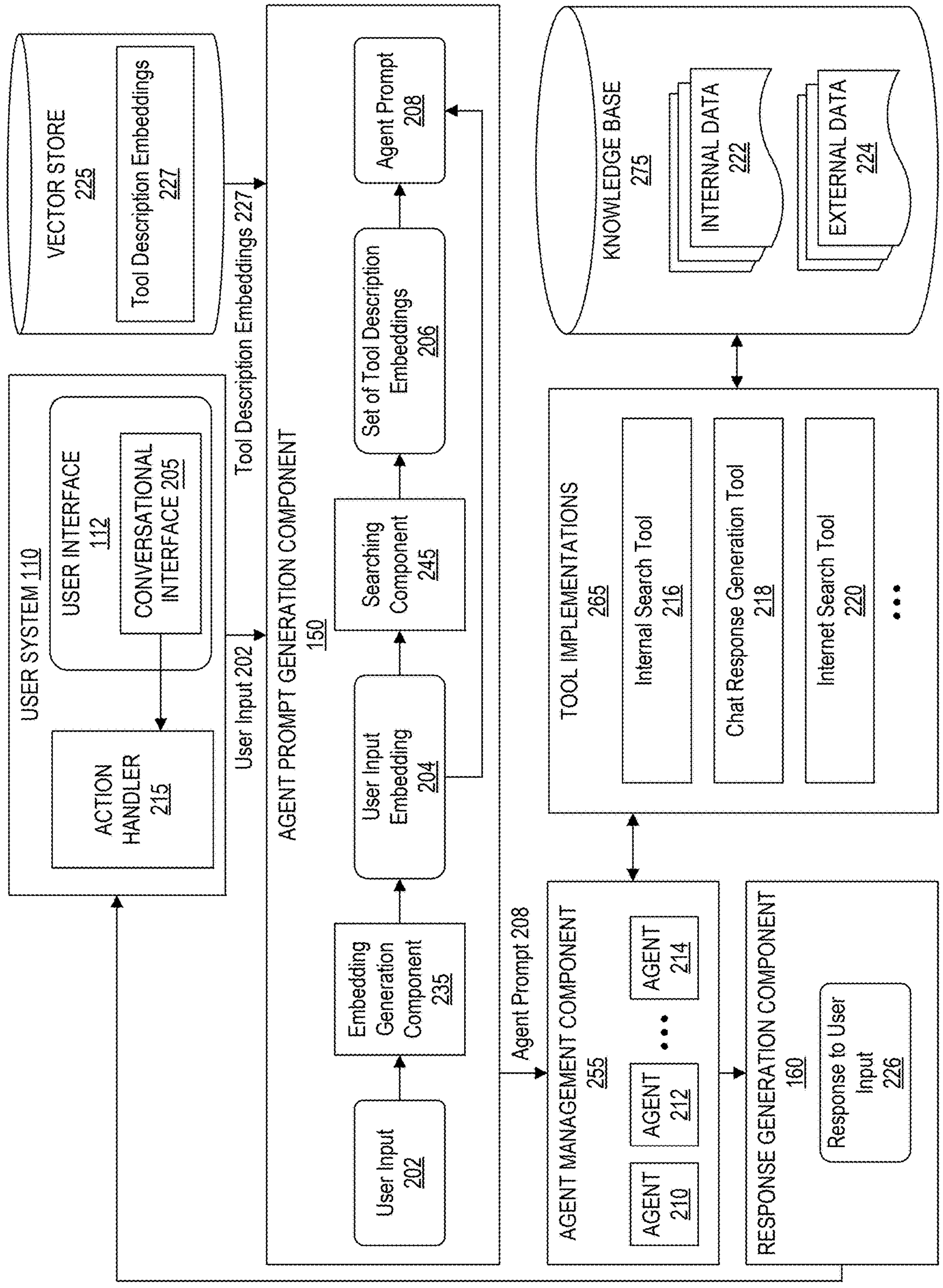
FIG. 2 illustrates another example computing system that includes an agent prompt generation component in accordance with some embodiments of the present disclosure.

FIG. 2 illustrates another example computing system 200 that includes agent management component 150 in accordance with some embodiments of the present disclosure. As shown in FIG. 2, example computing system 200 also includes user system 110, vector store 225, agent management component 255, tool implementations 265, knowledge base 275, and response generation component 160. User system 110 includes user interface 112 and action handler 215 and user interface 112 includes a conversational interface 205. In some embodiments, action handler 215 can add, change, or update data stored or displayed by user system 110. For example, action handler 215 can update a user profile such as billing information for a user of user system 110. Vector store 225 includes tool description embeddings 227. Agent prompt generation component 150 includes embedding generation component 235 and searching component 245. Agent management component 255 includes agents 210, 212, and 214. Tool implementations includes internal search tool 216, chat response generation tool 218, and internet search tool 220, among other tools not illustrated. Knowledge base 275 includes internal data 222 and external data 224. Internal data 222 is data that is internal to the system's servers and/or control and/or data that has been vetted and verified. For example, internal data 222 can include help center documents, databases, and/or articles. External data 224 is data that is external to the system's servers and/or control and/or data that has not been vetted and verified. For example, external data 224 can include internet sources not within the system and/or knowledge accessible through external APIs or other similar knowledge bases.

In some embodiments, vector store 225 and/or knowledge base 275 are implemented in a data storage device (e.g., data store 140 of FIG. 1). In some embodiments, this data store also include a graph database that stores relevant types of data. For example, the graph database can include group data (e.g., data about entities and/or content items nearby in a vector space or the graph database or otherwise connected, such as through metadata). In some embodiments, computing system 200 can supplement one or more of user input 202, user input embedding 204, tool description embeddings 227, set of tool description embeddings 206, agent prompt 208, and/or response to user input 226 using the graph database (e.g., via retrieval augmented generation of the data in the graph database). In some embodiments, the links and/or relationships in the graph database are represented as metadata (e.g., metadata for user input 202, user input embedding 204, and/or tool description embeddings 227). In some embodiments, agent prompt generation component 150 generates agent prompt 208 using the graph database. For example, agent prompt generation component 150 uses information about relationships in the graph database to determine agent prompt 208.

In some embodiments, conversational interface 205 is a portion of user interface 112. For example, user interface 112 is a mobile device application and/or web application and conversational interface 205 is a conversational interface implemented in the mobile device application and/or web application. A user of user system 110 can interact with conversational interface 205 to generate user input 202. For example, a user of user system can input text into user system 110 and user system 110 can send user input 202 including the input text to agent prompt generation component 150. Action handler 215 can implement actions for conversational interface 205 on user system 110. In some embodiments action handler 215 is implemented by application software system 130 running on user system 110. Further details regarding action handler 215 are described below.

Vector store 225 is data storage device for storing embeddings. In some embodiments, vector store 225 is included in a data store (e.g., data store 140 of FIG. 1). As shown in FIG. 2, vector store 225 includes tool description embeddings 227. For example, tool description embeddings 227 are embeddings of descriptions for tools available to an agent management component 255 of example computing system 200. In on example, as described in further detail with regard to FIG. 5, agent management component 255 includes an agent toolbox (e.g., agent toolbox 505 of FIG. 5) that includes descriptions for tools available to agent management component 255 through tool implementations 265. In some embodiments, the tools available are applications that can be accessed by agent management component 255 through application programming interfaces (APIs). For example, tool implementations 265 include APIs for a set of tools and agent management component 255 can interact with the tools through the APIs in tool implementations 265. In such embodiments, tool description embeddings 227 include embedding of the descriptions for the tools available in tool implementations 265. For example, tool description embeddings 227 include embeddings of text descriptions of inputs for the APIs, outputs for the APIs, and/or functions available to the APIs for each of the tools in tool implementations 265. In some embodiments, tool description embeddings 227 are generated by an embedding generation component (e.g., embedding generation component 235). The tool descriptions are not limited to text descriptions. For example, tool descriptions can include screenshots, video, and/or audio relating to the implementation for the respective tool. Accordingly, tool description embeddings 227 can include embeddings for the screenshots, video, and/or audio descriptions of the tools. In some embodiments, tool description embeddings 227 includes metadata for each of the embedded tool descriptions in tool description embeddings 227. For example, tool description embeddings 227 can include metadata for products that utilize certain tools and/or metadata identifying whether certain tools should be used more frequently than others.

User system 110 generates user input 202 and sends user input 202 to agent prompt generation component 150. In some embodiments, user system 110 generates user input 202 in response to a user interacting with user system 110 as described above. In some embodiments, user input 202 includes data about a user of the user system 110. For example, a user of user system 110 interacts with user interface 112 causing user system 110 to generate user input 202 including information about that user's profile. In some embodiments, user input 202 can therefore include historical data about the user of user system 110. In one example, user input 202 includes data about content subscriptions for the user of user system 110. For example, user input 202 can include which products a user is subscribed to and/or regularly uses. In one example, user input 202 includes information indicating a user wants to update their password information. For example, a user types into conversational interface 205 "I want to update the password on file for my account." In such an example, user system 110 and/or agent prompt generation component 150 can include metadata for current product subscriptions in user input 202. Accordingly, computing system 200 is able to determine how to update the password for the specific product that the user is subscribed to. In another example, user input 202 includes information indicating a user wants to update their billing information. For example, a user types into conversational interface 205 "I want to update the credit card on file for my account." In such an example, user system 110 and/or agent prompt generation component 150 can include metadata for current product subscriptions in user input 202.

Embedding generation component 235 of agent prompt generation component 150 receives user input 202 and generates user input embedding 204 from user input 202. In some embodiments, embedding generation component 235 includes a machine learning model configured to generate embeddings based on input (e.g., user input 202). For example, embedding generation component 235 includes a machine learning encoder for encoding text or images to vectors such as Word2Vec, CLIP or BERT or a large language model configured and trained to receive text input and generate an embedding representing that text input. In one example, embedding generation component 235 generates a numerical vector representing the semantic meaning of the text of user input 202. In other examples, user input 202 includes media other than text (e.g., pictures, audio, and/or video) and embedding generation component 235 generates a numerical vector representing the meaning of the relevant media. In some embodiments, user input 202 includes mixed media (e.g., text and a picture). In such an embodiment, embedding generation component 235 can generate separate user input embeddings 204 for each media component and/or can generate a single user input embedding 204 representing both media components. In some embodiments, user input embedding 204 includes metadata for user input 202. Continuing with the above examples, user input embedding 204 can include the embedding for the text input "I want to update the password on file for my account" and/or "I want to update the credit card on file for my account" as well as metadata indicating the product subscriptions for that user.

Searching component 245 of agent prompt generation component 150 receives user input embedding 204 and tool description embeddings 227. For example, agent prompt generation component 150 retrieves tool description embeddings 227 from vector store 225. Searching component 245 generates a set of tool description embeddings 206 by performing a similarity search between user input embedding 204 and tool description embeddings 227. For example, searching component 245 determines a set of tool description embeddings 206 of the tool description embeddings 227 with the shortest distance to user input embedding 204 in the vector space represented by user input embedding 204 and tool description embeddings 227. Continuing with the above example, searching component 245 can identify tools with tool descriptions similar (e.g., close in the representative vector space) to the embedding of "I want to update the credit card on file for my account." Such tools could include, for example, a tool for retrieving user account information, a tool for updating billing details, and/or a tool for generating text responses to the user input.

In some embodiments, searching component 245 determines set of tool description embeddings 206 using the metadata for user input embedding 204 and/or tool description embeddings 227. For example, searching component 245 can compare metadata and automatically select tools with tool description embeddings 227 including metadata matching the metadata for user input embedding 204. For example, user input embedding 204 includes metadata indicating the user is subscribed to a certain product and tool description embeddings 227 includes a tool description embedding with metadata indicating the tool is for that certain product. In such an example, searching component 245 includes the tool in set of tool description embeddings 206. In continuing with the above example, searching component 245 can use metadata indicating that user is subscribed to a specific product to match the tool for that product and to not match tools for other products. This allows agent prompt generation component 150 to prevent downstream hallucinations from including tools for multiple products when the user is only subscribed to one. Additionally, searching component 245 can use the metadata to determine an intent of multiple possible intents for user input embedding 204. For example, user input 202 can include a general questions such as "How do I increase the security for my account?" This user input could be interpreted in a variety of way, such as a thematic question (e.g., what are the best methods for increasing account security in general), a troubleshooting question (e.g., how do I improve the security for a specific product, such as updating a password), and/or a request for guidance (e.g., please connect me with an administrator that can assist me in improving my account security). As another example, user input 202 can include a general question such as "How do I launch the best performing ad campaign?" that can be interpreted as a thematic question (e.g., what are the best methods for launching ad campaigns in general), a troubleshooting question (e.g., how do I use a specific product to launch an ad campaign), and/or a request for guidance (e.g., please connect me with an administrator that can assist me in launching an ad campaign). In either example, searching component 245 can, for example, user metadata about a product the user is subscribed to determine whether the intent behind user input 202 is thematic, troubleshooting, and/or request for guidance.

In some embodiments, tool description embeddings 227 includes metadata indicating a bias value. For example, each of the tool description embeddings of tool description embeddings 227 include metadata with a bias value for how often that tool should be used. In some embodiments, searching component 245 uses this bias value when determining set of tool description embeddings 206. For example, tools that rely on internal data (e.g., internal data 222) that has been vetted may be considered more reliable than tools that rely on external data (e.g., external data 224). Accordingly, searching component 245 can use the bias values for the appropriate tool description embeddings to include tool description embeddings with higher reliability in set of tool description embeddings 206. In some embodiments, searching component 245 selects the most appropriate tool descriptions using a similarity search and determines set of tool description embeddings 206 including the bias values. In such embodiments, agent prompt generation component 150 generates agent prompt 208 including the most appropriate tool descriptions and the associated bias values.

As shown in FIG. 2, agent prompt generation component 150 generates agent prompt 208 using user input embedding 204 and set of tool description embeddings 206. For example, agent prompt generation component 150 generates agent prompt 208 including instructions to respond to user input 202 using the set of tools described by set of tool description embeddings 206. In some embodiments, as described above, agent prompt generation component 150 generates agent prompt 208 using a graph database. In some embodiments, agent prompt generation component 150 generates agent prompt 208 including user input embedding 204 and set of tool description embeddings 206. In other embodiments, agent prompt generation component 150 generates agent prompt 208 including user input 202 and the set of tool descriptions associated with set of tool description embeddings 206 rather than the embeddings themselves. In some embodiments, agent prompt generation component 150 generates agent prompt 208 using the metadata from user input embedding 204. For example, agent prompt generation component 150 generates agent prompt 208 identifying the product that the user is subscribed to with instructions specific to that product.

In continuing with the above examples, agent prompt generation component 150 can generate a prompt for responding to the user input 202 of "I want to update the password on file for my account." For example, agent prompt 208 can include the following: "You are a professional consultant and should maintain a formal and business-like demeanor. While offering advice, you should be encouraging yet professional, ensuring a tone that reflects expertise and confidence. Your interactions should be characterized by a sense of professionalism, mirroring the interaction one would expect from a seasoned digital security consultant. Focus on delivering concise, clear, and expert advice, always aiming to instill confidence in your users. Your approach should be straightforward, focusing on providing value and practical solutions while maintaining a respectful and polished tone in all your communications." Similarly, agent prompt generation component 150 can generate a prompt for responding to the user input 202 of "I want to update the credit card on file for my account." For example, agent prompt 208 can include the following: "You are a professional consultant and should maintain a formal and business-like demeanor. While offering advice, you should be encouraging yet professional, ensuring a tone that reflects expertise and confidence. Your interactions should be characterized by a sense of professionalism, mirroring the interaction one would expect from a seasoned marketing consultant. Focus on delivering concise, clear, and expert advice, always aiming to instill confidence in your users. Your approach should be straightforward, focusing on providing value and practical solutions while maintaining a respectful and polished tone in all your communications." In some embodiments, agent prompt 208 also includes the embedding for the user input 202.

Agent prompt generation component 150 sends agent prompt 208 to agent management component 255. Agent management component 255 receives agent prompt 208 and causes agents 210, 212 and 214 to execute the instructions included in agent prompt 208 using the tools referenced by set of tool description embeddings 206. In some embodiments, agent management component 255 operates as an intermediary between the agents and other components of computing system 200 (e.g., agent prompt generation component 150 and tool implementations 265). For example, agent management component 255 receives agent prompt 208 and generates multiple prompts for each of agents 210, 212, and 214. In some embodiments, agent management component 255 operates as an intermediary between agents 210, 212, and 214 themselves. For example, agent management component 255 applying a prompt to agent 210 to gather information, receives the information from agent 210, and uses the information to generate a prompt for agent 212. In some embodiments, agent management component 255 is a machine learning model which receives a prompt and generates outputs based on the prompt. In such an embodiment, agents 210, 212, and 214 can be interpreted as parts of this machine learning model that generate different steps of the output for the same prompt. For example, agent management component 255 is an LLM that receives a prompt and generates an output including multiple API function calls for the prompt.

Agents 210, 212, and 214 are automated agents with the ability to interpret the instructions in agent prompt 208 and behave accordingly. In some embodiments, therefore, agents 210, 212, and/or 214 do not utilize every tool included in set of tool description embeddings 206. For example, while agent prompt 208 includes set of tool description embeddings 206 for tools that may be beneficial, agents 210, 212, and/or 214 can decide which tools to actually use when responding to agent prompt 208. In some embodiments, agents 210, 212, and 214 are implemented as machine learning models capable of receiving a prompt and engaging in actions based on the prompt. For example, agents 210, 212, and 214 are large language models (e.g., encoder decoder component 605 of FIG. 6) with the ability to receive a natural language prompt and generate an output that can accomplish an action based on the prompt. In one example, an agent receives a prompt and outputs an API call to address the prompt. In some embodiments, agents 210, 212, and 214 accomplish actions through an agent toolbox (e.g., agent toolbox 505 of FIG. 5). For example, the agent toolbox can include API functions that agent management component 255 and agents 210, 212, and 214 can call. Further details regarding the agent toolbox are discussed with reference to FIG. 5.

In some embodiments, agent prompt 208 includes multiple prompts for different agents of agent management component 255. For example, agent prompt 208 can include a prompt for one of agents 210, 212, and 214 to generate a response to user input 202 based on a first set of criteria, a prompt for another one of agents 210, 212, and 214 to evaluate the generated response based on a second set of criteria, and a prompt for another one of agents 210, 212, and 214 to revise the response using a third set of criteria based on the evaluation.

In some embodiments, agent management component 255 includes agents implementing a self-reflecting react cycle. For example, agent management component 255 can generate a response to user input 202 based on agent prompt 208 and then evaluate its own response to determine whether the response is satisfactory. In some embodiments, agent management component 255 uses a different agents for generating the response and checking the generated response. For example, agent 210 generates a response to user input 202 based on agent prompt 208 and agent 212 determines whether the response generated by agent 210 is satisfactory. In some embodiments, if agent 212 determines that the response is not satisfactory, agent 212 can send the response to agent 214 to correct the response. In some embodiments, agents 210, 212, and 214 are large language models that can respond to instructions in agent prompt 208 to execute actions using tools identified by set of tool description embeddings 206 and accessible to the agents 210, 212, and 214 through tool implementations 265.

In some embodiments, in order to ensure that different agents 210, 212, and 214 can check each other, each of agents 210, 212, and 214 are trained using different data sets and/or hyperparameters and therefore have different personas with separate thinking processes. For example, given a same input, agents 210, 212, and 214 can generate different outputs. Accordingly, agents 210, 212, and 214 can work together to ensure that each of their built-in criteria is satisfied. In other embodiments, as described above, agent prompt 208 can include multiple prompts for different agents 210, 212, and 214 to use separate thinking processes. In some embodiments, agent management component 255 generates a prompt for each agent of agents 210, 212, and 214 using agent prompt 208. For example, agent management component 255 receives agent prompt 208 and generates a prompt for agent 210 to generate a response to user input 202, a prompt for agent 212 to evaluate the generated response, and a prompt for agent 214 to revise the response based on the evaluation. As explained above, agents 210, 212, and 214 can have different thinking processes (e.g., due to different sets of training data, different prompts, different hyperparameters, etc.). Additionally, agents 210, 212, and 214 may use different tools and/or have access to different knowledge bases (e.g. internal data 222 and external data 224). Accordingly, a response generated by agent 210 may not be sufficient for agent 212 and agent 212 can cause agent 214 to use a different tool to update the response. For example, the user input 202 includes questions relating to both internally accessible data (e.g., data in internal data 222) and internally inaccessible data (e.g., data in external data 224). In such an example, agent 210 may generate a response using a tool that only has access to internal data 222. Accordingly, the response generated by agent 210 may not address all of the questions in user input 202. Agent 212 can therefore determine that the response is not sufficient and in response, agent management component 255 may generate a prompt to cause agent 214 to address user input 202 using external data 224. For example, agent 212 determines that the response is not sufficient based on its own dataset (e.g., external data 224). In some embodiments, agent 212 evaluates the response generated by agent 210 to prevent hallucinations. For example, agent 212 is given a prompt (and/or trained on data) to specifically check for and prevent hallucinations in the response generated by agent 210.

Agent management component 255 can use tool implementations 265 to generate a response to agent prompt 208 using tools specified by set of tool description embeddings 206. As shown in FIG. 2, tool implementations 265 can include an internal search tool 216, a chat response generation tool 218, and an internet search tool 220 among others. Each of these tools can have APIs available to agent management component 255 allowing agents 210, 212, and 214 to execute functions of the API to respond to agent prompt 208. In some embodiments, each of the functions available to the APIs for tool implementations 265 have their own tool descriptions and therefore their own tool description embeddings included in vector store 225.

In some embodiments, tool implementations 265 includes tools for handling specific endpoints. In continuing with the above examples, tool implementations 265 include tools for retrieving account information, updating account details, and handling responses. For example, agent 210 accesses internal search tool 216 and retrieves account password information (e.g., last time the password was updated) for the user of user system 110. Agent 210 provides this account password information to agent 212 and agent 212 accesses chat response generation tool 218 to generate a response to the user input 202 of "I want to update the password on file for my account" including the retrieved account password information. Agent management component 255 sends the response generated by agent 212 (e.g., response to agent prompt 208) using chat response generation tool 218 to response generation component 160 and response generation component 160 generates a response to user input 226 using the response to agent prompt 208 and sends the generated response to user system 110. In some embodiments, response generation component 160 sends the response to agent prompt 208 received from agent management component 255 as response to user input 226. The response could be, for example, "I understand you want to update the password information for your account. I can help you with that. Please provide an updated password." In such an example, the user of user system 110 can input more information which agent prompt generation component 150 can combine with historical chat data to generate an updated user input 202 and therefore updated user input embedding 204 and agent prompt 208. Agent prompt generation component 150 can send the updated agent prompt 208 to agent management component 255 causing agent 214 to access a tool for updating the account details (not illustrated). Agent 214 can send the result of updating the account details to agent 212 who can generate another response to agent prompt 208.

In continuing with the alternate example, tool implementations 265 include tools for retrieving account information, updating billing details, and handling responses. For example, agent 210 accesses internal search tool 216 and retrieves account billing information for the user of user system 110. Agent 210 provides this account billing information to agent 212 and agent 212 accesses chat response generation tool 218 to generate a response to the user input 202 of "I want to update the credit card on file for my account" including the retrieved account billing information. Agent management component 255 sends the response generated by agent 212 (e.g., response to agent prompt 208) using chat response generation tool 218 to response generation component 160 and response generation component 160 generates a response to user input 226 using the response to agent prompt 208 and sends the generated response to user system 110. In some embodiments, response generation component 160 sends the response to agent prompt 208 received from agent management component 255 as response to user input 226. The response could be, for example, "I understand you want to update the billing information for your account. I can help you with that. Your billing information on file is for a credit card ending in #### with an expiration date of XX/XXXX. Please provide an updated payment method." In such an example, the user of user system 110 can input more information which agent prompt generation component 150 can combine with historical chat data to generate an updated user input 202 and therefore updated user input embedding 204 and agent prompt 208. Agent prompt generation component 150 can send the updated agent prompt 208 to agent management component 255 causing agent 214 to access a tool for updating the billing details (not illustrated). Agent 214 can send the result of updating the billing details to agent 212 who can generate another response to agent prompt 208.

In some embodiments, response generation component 160 sends a status update to user system 110. For example, response generation component 160 can send a status update in response to agent management component 255 implementing tools of tool implementations 265. For example, in response to agent management component 255 accessing internet search tool 220, response generation component 160 can generate a status update such as "Searching the internet for an answer to your question" and send the generated status update to user system 110 via conversational interface 205. Similarly, in response to agent management component 255 accessing agent communication tool 314 of FIG. 3, response generation component 160 can generate a status update such as "Finding someone to answer your question" and send the generated status update to user system 110 via conversational interface 205. In some embodiments, response generation component 160 therefore generates a status update using the tools accessed by agent management component 255.

In some embodiments, agent prompt 208 can include the option to use a tool of tool implementations 265. For example, agent prompt 208 includes "If you feel that you need to research the question (for example, if they ask about a competitor or something current and topical), you can surf the internet to inform your response. Provide the URL for any results you reference online." In such embodiments, agent management component 255 can determine whether to use the identified tool based on agent prompt 208. In one example, agent management component 255 determines that user input 202 includes a questions about a competitor that cannot be answered using internal search tool 216. In such an example, agent 210 accesses internet search tool 220 to search the internet for a response to user input 202 and provides the results of the search to agent 212 to generate a response to the user input 202 using chat response generation tool 218.

As shown in FIG. 2, tools in tool implementations 265 can access knowledge base 275. For example, certain tools may have access to certain portions of knowledge base 275. In one example, internal search tool 216 has access to an internal data 222 and internet search tool 220 has access to external data 224. In some embodiments, agent prompt generation component 150 can determine a subset of knowledge base 275 and include the determined subset in agent prompt 208. For example, agent prompt generation component 150 can determine a relevant subset of knowledge base 275 using metadata for user input 202 and/or user input embedding 204. In such an example, agent prompt generation component 150 can include the relevant subset of the knowledge base 275 in agent prompt 208. This reduces the amount of resources required by the searching tools (e.g., internal search tool 216 and internet search tool 220) by limiting the search to only the relevant information based on the metadata for user input 202 and/or the user input embedding 204. In one embodiment, the metadata for user input embedding 204 indicates that the user of user system 110 is subscribed to a specific product and agent prompt generation component 150 generates a subset of knowledge base 275 limited to references for that product.

In some embodiments, tool implementations 265 include tool authentications. For example, certain sensitive tools, such as a billing information tool are only accessible by authorized agents. In such embodiments, an agent of agent management component 255 can send a request to use a tool in tool implementations 265. In response to the request, tool implementation 265 authenticates the request and/or the agent before allowing the agent access to the tool. In some embodiments, such tool authentications include, for example, a two factor authentication tool. In such an example, the authentication tool can require further authentication before any other agents of agent management component 255 can proceed.

In some embodiments, computing system 200 includes a feedback mechanism. For example, user system 110 can include a feedback interface within user interface 112 allowing a user to provide feedback on response to user input 226. In such embodiments, computing system 200 logs the actions taken by agents of agent management component 255 as well as the feedback received from user system 110. In some embodiments, computing system 200 trains one or more machine learning models using the feedback. For example, computing system 200 trains agent management component 255 using feedback received from user system 110. Causing agent management component 255 to use different tools of tool implementations 265 and/or use the tools differently. As an alternative example, computing system 200 can train generation component 235 and/or searching component 245 to generate more accurate embeddings and/or provide additional search parameters in response to the feedback.

In some embodiments, computing system 200 including functionality for a confirmation and/undo process. For example, in response to an agent executing a function using a tool of tool implementations 265 and response generation component 160 sending response to user input 226 including the executed function, a user of user system 110 can confirm the action and/or request to undo the action. If the user requests to undo the action, computing system 200 can reverse the action executed by agent management component 255.

In some embodiments, response to user input 226 includes actions to implement on user system 110. For example, response to user input 226 includes instructions to cause user system 110 to add, change, or update data stored or displayed by user system 110. In one embodiment, in response to receiving response to user input 226, user system 110 sends the actions to action handler 215 causing action handler 215 to add, change, or update data stored or displayed by user system 110. For example, action handler 215 can update a user profile such as billing information for a user of user system 110.

Figure 3:
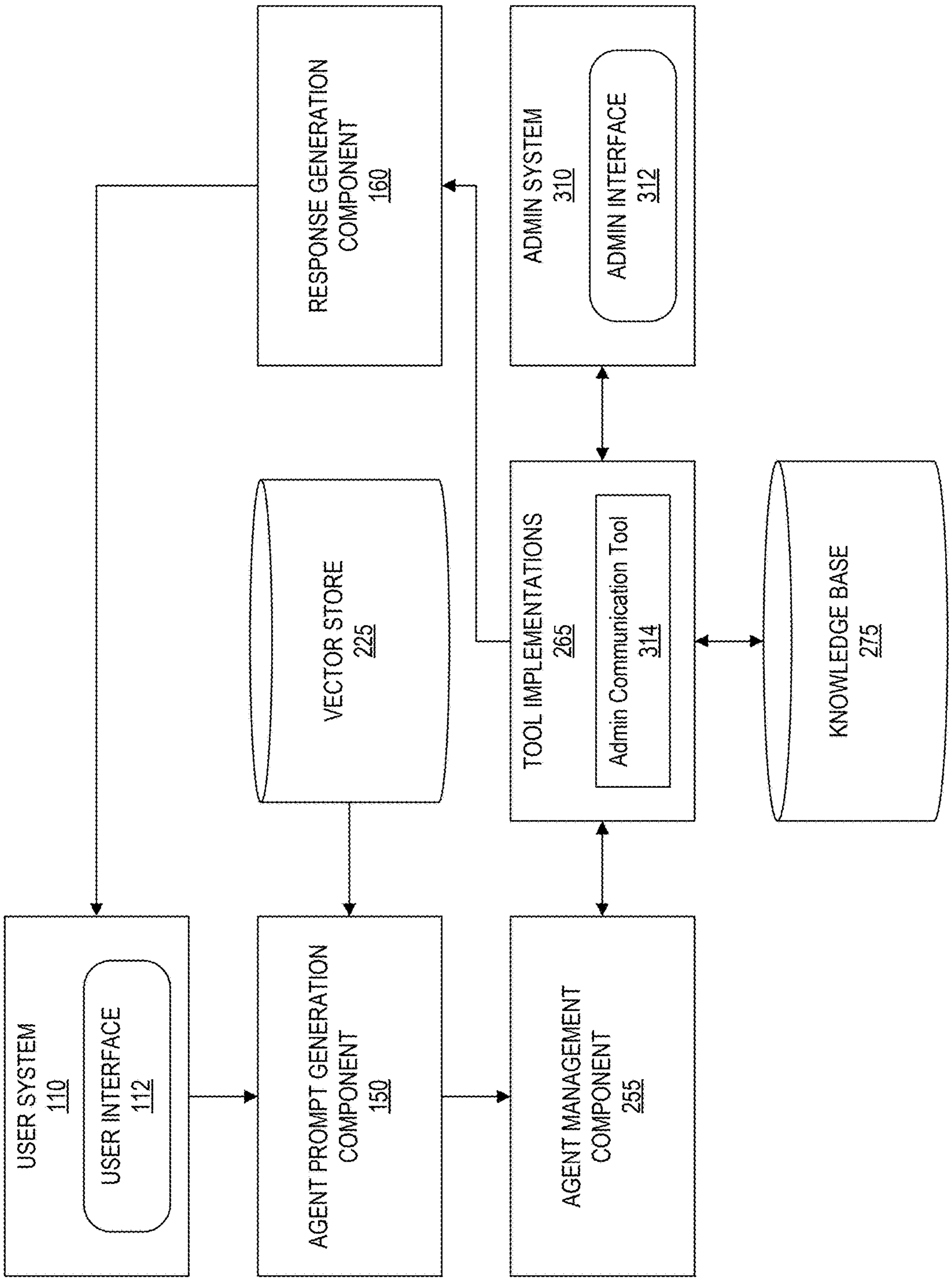
FIG. 3 illustrates another example computing system that includes an agent prompt generation component in accordance with some embodiments of the present disclosure.

FIG. 3 illustrates another example computing system 300 that includes an agent prompt generation component 150 in accordance with some embodiments of the present disclosure. As shown in FIG. 3, computing system 300 can also include user system 110, vector store 225, agent management component 255, tool implementations 265, knowledge base 275, response generation component 160, and admin system 310. Admin system 310 includes admin interface 312.

Admin system 310 includes at least one computing device, such as a personal computing device, a server, a mobile computing device, or a smart appliance. Admin system 310 includes at least one software application, including an admin interface 312, installed on or accessible by a network to a computing device. For example, admin interface 312 can be or include a front-end portion of an application software system (such as application software system 130 of FIG. 1).

Admin interface 312 is any type of user interface as described above. Admin interface 312 can be used to input data and view or otherwise perceive output that includes data produced by application software system 130. For example, admin interface 312 can include a graphical user interface and/or a conversational voice/speech interface that includes a mechanism for interacting with a chat and viewing the chat history and/or other digital content. Examples of admin interface 312 include web browsers, command line interfaces, and mobile apps. Admin interface 112 as used herein can include application programming interfaces (APIs).

A client portion of an application software system (such as application software system 130 of FIG. 1) can operate in admin system 110, for example as a plugin or widget in a graphical user interface of a software application or as a web browser executing admin interface 312. In an embodiment, a web browser can transmit an HTTP request over a network (e.g., the Internet) in response to admin input that is received through an admin interface provided by the web application and displayed through the web browser. A server running application software system 130 and/or a server portion of application software system 130 can receive the input, perform at least one operation using the input, and return output using an HTTP response that the web browser receives and processes. In some embodiments, admin system 310 is bidirectionally communicatively coupled to other components of computing system 300 by a network (such as network 120 of FIG. 1).

As shown in FIG. 3, admin system 310 can be bidirectionally coupled with tool implementations 265. In some embodiments, agent management component 255 can use interaction with admin system 310 as a tool in tool implementations 265. For example, an agent of agent management component 255 can access admin communication tool 314 for sending and receiving data from admin system 310. In some embodiments admin system 310 is a human operated system. In such embodiments, agent management component 255 can take user interactions with the admin user of admin system 310 to answer questions, generate responses, and perform actions that are otherwise unavailable to agent management component 255.

In some embodiments, agent management component 255 accesses the admin communication tool 314 to interact with admin system 310 when agent management component 255 cannot respond to agent prompt 208 and/or perform the requested actions of agent prompt 208 using its set of tools and knowledge base. In other embodiments, agent management component 255 accesses the admin communication tool 314 to interact with admin system 310 when agent management component 255 has uncertainty about the generated response (e.g., response to agent prompt 208) that exceeds a threshold uncertainty. For example, agent management component 255 generates a question for admin system 310, sends the question to admin system 310, receives a reply from admin system 310, and generates an output to the user input using the reply from admin system 310.

In some embodiments, agent management component 255 generates a self-contained question and sends the self-contained question to admin system 310 using admin communication tool 314. For example, if there is a portion of user input 202 that agent management component 255 cannot respond to based on available tools and/or knowledge base (e.g., tool implementations 265 and knowledge based 275), agent management component 255 can generate a question for clarification and send the question to admin system 310 using admin communication tool 314. In such an embodiment, agent management component 255 can receive a response from admin system 310 through admin communication tool 314 and incorporate knowledge from the response into its response to the user input (e.g., response to user input 226).

In some embodiments, agent prompt generation component 150 and agent management component 255 act as a message broker and receive user input 202 from user system 110, forward user input 202 to admin system 310, receive admin input from admin system 310, forward the admin input to user system 110, and so on. In some embodiments, agent management component 255 determines whether to generate a self-contained question or to act as a message broker based on whether an uncertainty for agent prompt 208 satisfies an uncertainty threshold.

Figure 4:
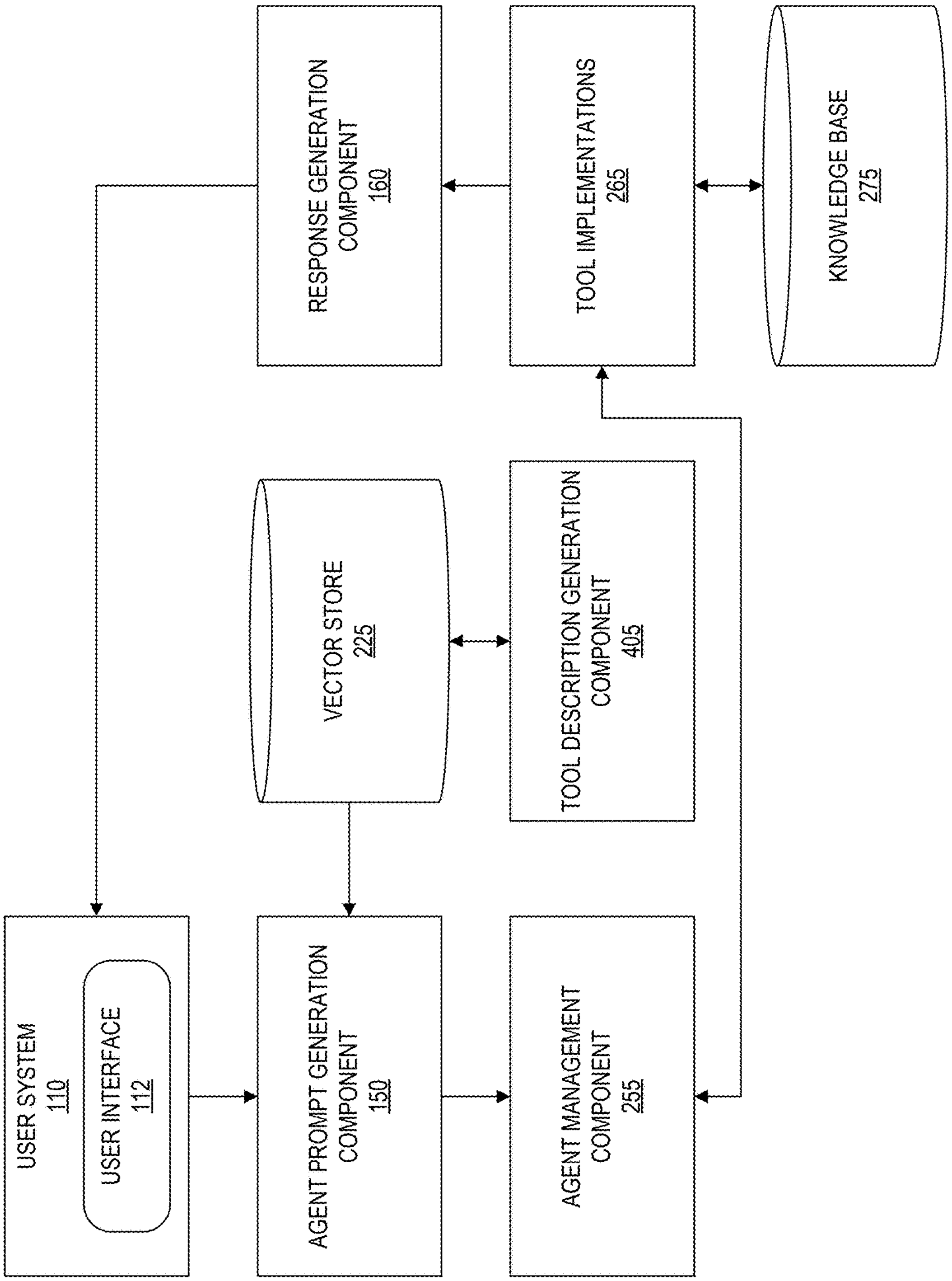
FIG. 4 illustrates another example computing system that includes an agent prompt generation component in accordance with some embodiments of the present disclosure.

FIG. 4 illustrates another example computing system 400 that includes an agent prompt generation component 150 in accordance with some embodiments of the present disclosure. As shown in FIG. 4, computing system 400 can also include user system 110, vector store 225, agent management component 255, tool description generation component 405, tool implementations 265, knowledge base 275, and response generation component 160.

As shown in FIG. 4, tool description generation component 405 is bidirectionally coupled with vector store 225 to receive tool descriptions from vector store 225 and send tool descriptions to vector store 225. For example, tool description generation component 405 generates tool descriptions for tools in tool implementations 265 and generates tool descriptions embeddings (e.g., tool description embeddings 227) for the tool descriptions using an embedding generation component (e.g., embedding generation component 235 of FIG. 2).

In some embodiments, tool description generation component 405 is itself implemented as a tool in tool implementations 265. For example, agent management component 255 can include agents that can edit tool descriptions for tools in tool implementations 265. In some embodiments, agent management component 255 can use agents to edit tool descriptions based on a review of an agent-generated response. For example, agent 210 of agent management component 255 generates a response to user input 202 using chat response generation tool 218. Agent 212 evaluates the response generated by agent 210 and determines that the response is inadequate (e.g., contains factual errors, hallucinations, improper tone, etc.). Agent management component 255 therefore causes agent 214 to edit the tool description for chat response generation tool 218 based on the evaluation. By allowing the agents to edit the tool descriptions, computing system 400 can ensure that agent management component 255 uses the proper tools for the user input. In some embodiments, tool description generation component 405 generates tool descriptions for a new tool using existing tool descriptions. For example, tool implementations 265 includes APIs for different applications with associated descriptions. Tool description generation component 405 can add and/or update the tool descriptions for these applications and/or API functions when new application APIs are added to computing system 400 and/or when new functions are added to existing APIs. In some embodiments, agent management component 255 can then regenerate response to user input 226 using the updated tool descriptions. In some embodiments, tool implementations 265 includes a code generation tool and agents of agent management component 255 can access the code generation tool to generate code. In such embodiments, agent management component 255 can use an agent to generate code to access an API that was not previously accessible through tool implementations 265. In such embodiments, tool description generation component 405 can then generate a tool description for the new API tool using the generated code and/or existing tool descriptions for other APIs.

Accordingly, computing system 400 can automate the scaling and addition of tools and tool descriptions.

Figure 5:
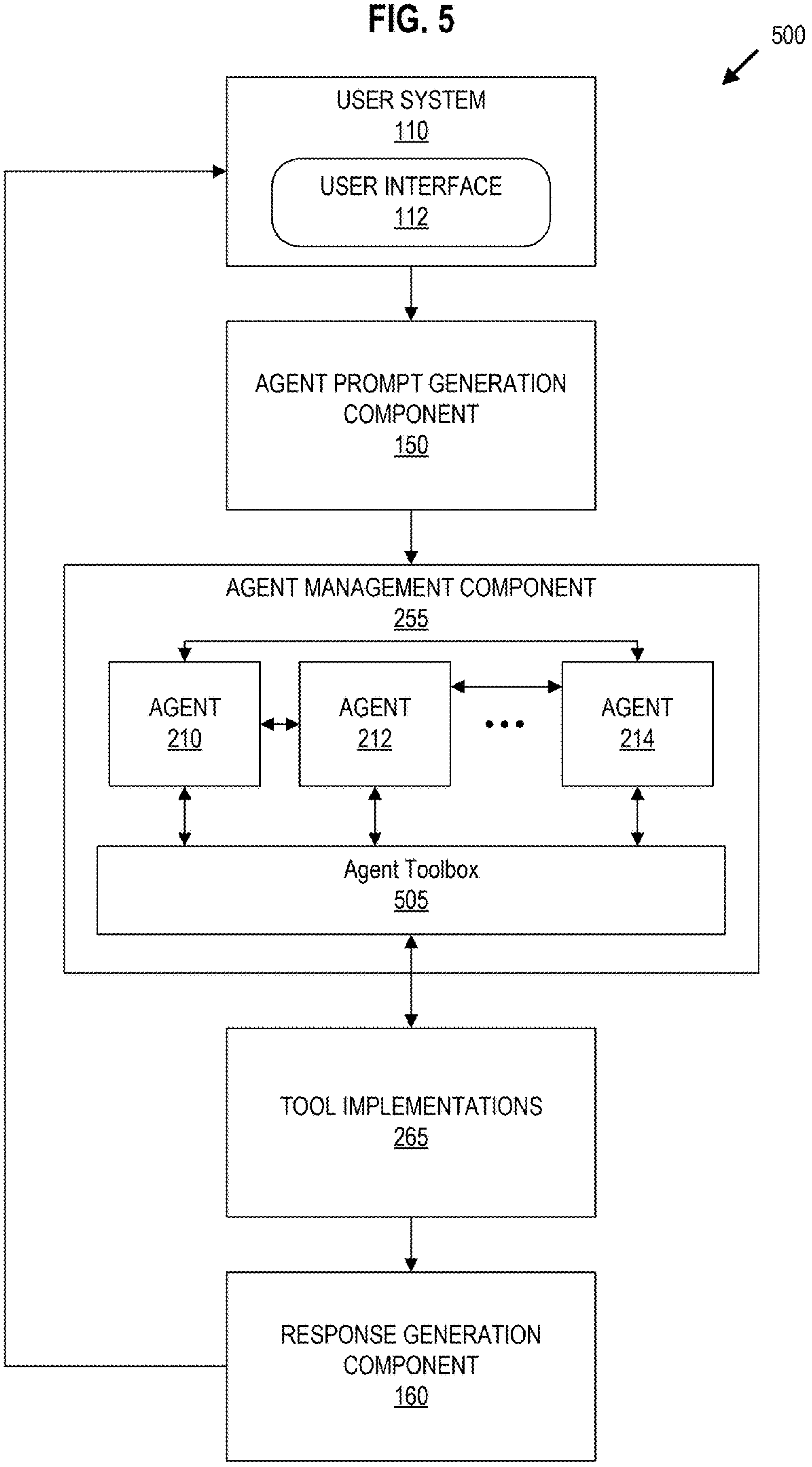
FIG. 5 illustrates another example computing system that includes an agent prompt generation component in accordance with some embodiments of the present disclosure.

FIG. 5 illustrates another example computing system 500 that includes an agent prompt generation component 150 in accordance with some embodiments of the present disclosure. As shown in FIG. 5, computing system 500 can also include user system 110, agent management component 255, tool implementations 265, and response generation component 160. Agent management component 255 includes agents 210, 212, and 214 and agent toolbox 505.

As explained above, agents 210, 212, and 214 can access tools (such as APIs) implemented by tool implementations 265 based on the tool descriptions. For example, agent toolbox 505 includes tool descriptions for the tools implemented by tool implementations 265. Agent management component 255 can determine which tools to use based on the tool descriptions. For example, agent prompt 208 includes set of tool description embeddings 206 and agent management component 255 can determine which tools to access in tool implementations 265 using the associated tool descriptions. Agents 210, 212, and 214 can use agent toolbox 505 to interact with tool implementations 265. For example, agent toolbox 505 includes the API calls for agents 210, 212, and 214 to execute the functions for tools in tool implementations 265.

In some embodiments, each of agents 210, 212, and 214 are coupled with each other to provide information and feedback collaboratively. For example, as explained in detail above, agent 210 can generate a response, agent 212 can evaluate the response, and agent 214 can update the response based on the evaluation. In other examples, agent 210 can generate computer code (e.g., computer code for accessing an API not currently included in tool implementations 265), agent 212 can evaluate and/or update the computer code, and agent 214 can implement the computer code to access a new API. In some embodiments, as described with reference to FIG. 4, another agent of agent management component 255 can generate a tool description for the new API (e.g., by using tool description generation component 405).

In some embodiments, agent management component 255 implements agents for information gathering, content generation, evaluation, and implementation. For example, one or more of agents 210, 212, and 214 can gather information (e.g., from internal data 222 using internal search tool 216, from external data 224 using internet search tool 220, and/or from admin system 310 using admin communication tool 314) which is provided to the other agents of agent management component 255. One or more of agents 210, 212, and 214 can generate new content (e.g., using chat response generation tool 218, admin communication tool 314, and/or tool description generation component 405) such as responses to user input, questions to an admin system, code for accessing an API, and/or tool descriptions and provide the generated content to the other agents of agent management component 255. One or more of agents 210, 212, and 214 can evaluate generated content and evaluate and/or update the generated content and provide the evaluations and/or updates to the other agents of agent management component 255. One or more of agents 210, 212, and 214 can implement actions on behalf of the other agents, user, and/or admin and provide the results of the actions to the other agents of agent management component 255.

Figure 6:
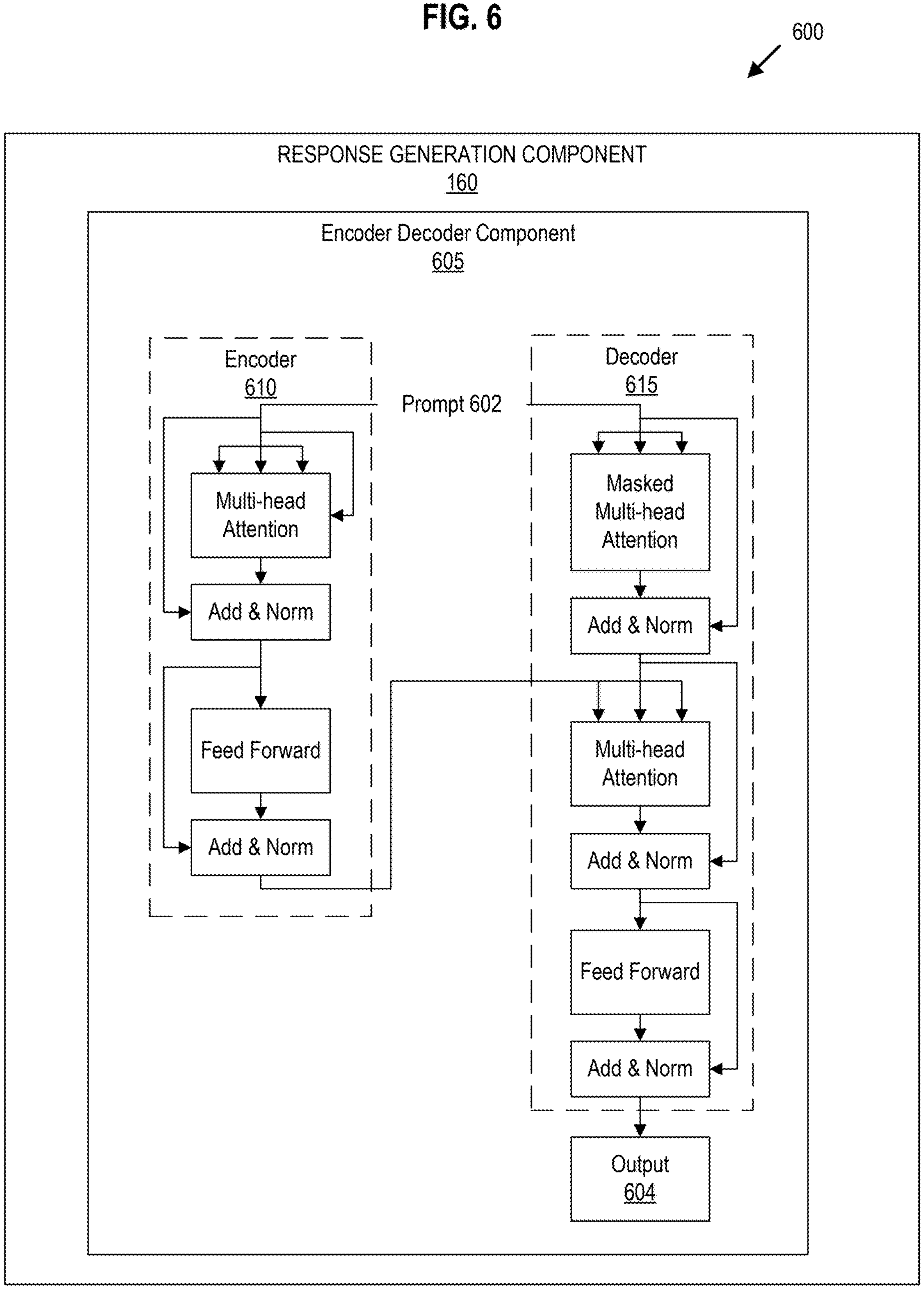
FIG. 6 illustrates an example computing system that includes a response generation component in accordance with some embodiments of the present disclosure.

FIG. 6 illustrates an example computing system 600 that includes an encoder decoder component in accordance with some embodiments of the present disclosure. As shown in FIG. 6, encoder decoder component 605 includes an encoder 610 and a decoder 615 which together produce an output 604. In some embodiments, one or more of agents 210, 212, and 214 are represented by an encoder decoder component such as encoder decoder component 605. In some embodiments, response generation component 160 includes an encoder decoder component 605.

In some embodiments, the encoder decoder component 605 is constructed using a neural network-based machine learning model architecture. In some embodiments, the neural network-based architecture includes one or more self-attention layers (e.g., multi-head attention layers and masked multi-head attention layers) that allow the model to assign different weights to different features included in the model input. Alternatively, or in addition, the neural network architecture includes feed-forward layers and residual connections (e.g., add & norm layers) that allow the model to machine-learn complex data patterns including relationships between different inputs and outputs in multiple different contexts. In some embodiments, encoder decoder component 605 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the agent and/or response generation system.

As shown in FIG. 6, encoder decoder component 605 feeds a prompt 602 into encoder 610 and decoder 615. For example, encoder decoder component 605 feeds the inputs of an agent prompt into the multi-head attention layer of encoder 610. In some embodiments, the inputs of an agent prompt are a series of tokens and the output of the encoder. Encoder decoder component 605 feeds the output of encoder 610 and outputs of the prompt into decoder 615 which generates a sequence of tokens based on the output of encoder 610 and the inputs of prompt 602. While a specific architecture of encoder 610 and decoder 615 is shown for simplicity, as explained above, the exact number and arrangement of layers of each type as well as the hyperparameter values used to configure the model are determined based on the requirements of a particular design or implementation. Additionally, specific architectures for encoder 610 and decoder 615 as well as encoder decoder component 605 as a whole may differ across different agents and/or components. For example, different agents can include a different number and/or arrangement of layers and therefore generate different outputs for the same prompt input. Encoder decoder component 605 can therefore include different numbers, arrangements, and types of layers, such that each input of prompt 602 is fed through the layers of encoder decoder component 605 and is dependent on other input tokens of prompt 602.

As mentioned above, encoder decoder component 605 illustrates a generic encoder/decoder model for simplicity. In such a model, encoder 610 encodes the input into a fixed-length vector and decoder 615 decodes the fixed-length vector into an output 604. Encoder 610 and decoder 615 are trained together to maximize the conditional log-likelihood of the output given the input. For example, once trained, encoder 610 and decoder 615 can generate an output given an input sequence or can score a pair of input/output sequences based on their probability of coexistence. In some embodiments, different encoder decoder component 605 (e.g., for different agents) are trained on different sets of data and therefore generate outputs based on a given input differently and/or score input/output pairs differently.

In some embodiments, encoder decoder component 605 can train and/or execute one or more encoder/decoder pairs to generate a response based on an input prompt. In some embodiments, encoder decoder component 605 is implemented by response generation component 160 of FIG. 2. For example, encoder decoder component 605 generates user input 226 from at least agent prompt 208. In some embodiments, encoder decoder component 605 is implemented by embeddings generation component 235 of FIG. 2. For example, encoder decoder component 605 generates user input embedding 204 based on a prompt including user input 202. In some embodiments, encoder decoder component 605 is implemented by one or more of agents 210, 212, and 214 of FIG. 2. For example, an agent can determine an output action based on an input prompt. As an alternative example, an agent can generate output code based on an input prompt.

Figure 7:
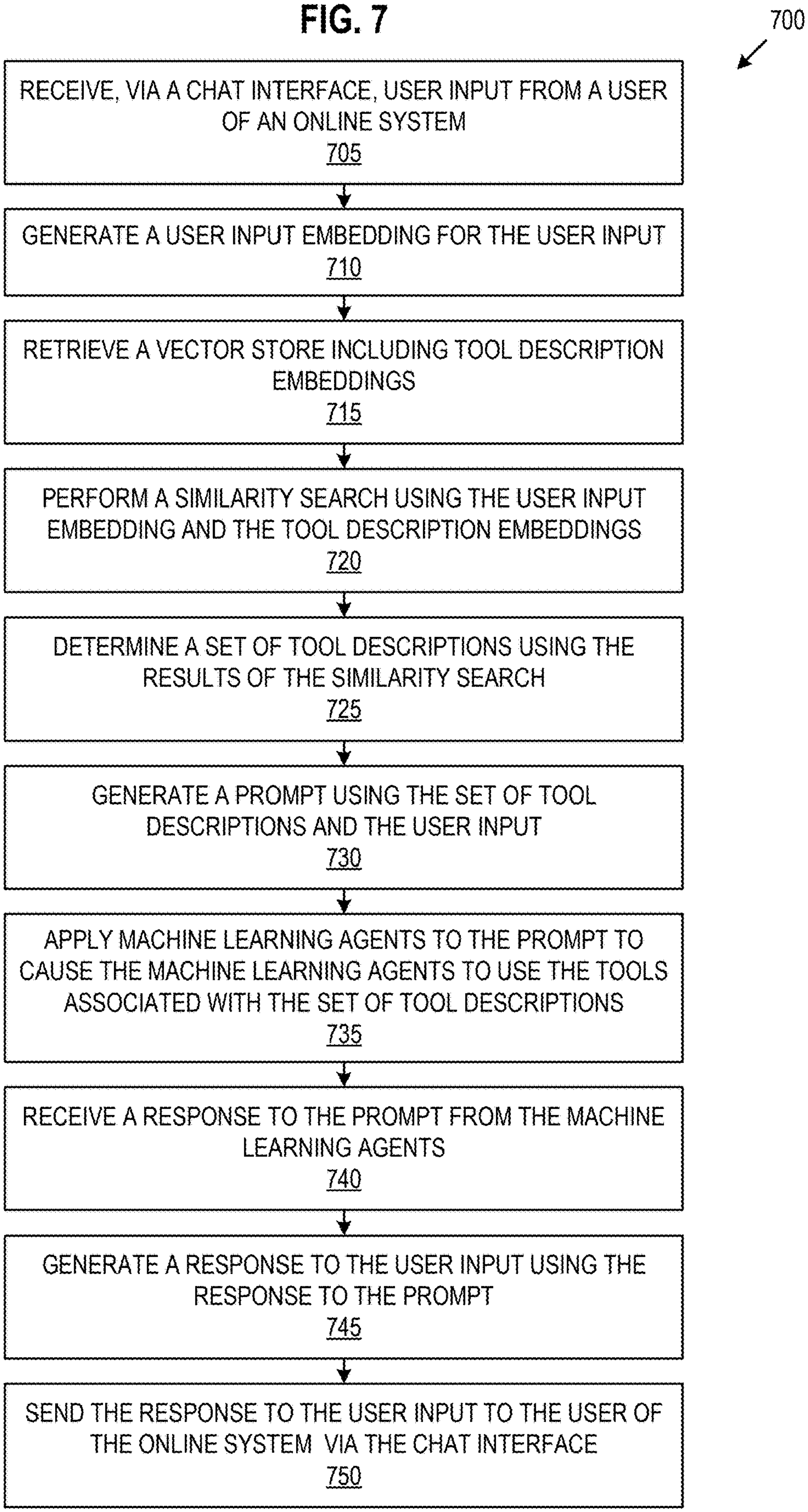
FIG. 7 is a flow diagram of an example method to generate an agent prompt using tool description embeddings in accordance with some embodiments of the present disclosure.

FIG. 7 is a flow diagram of an example method 700 to generate an agent prompt using tool description embeddings, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by agent prompt generation component 150 of FIG. 1. In some embodiments, parts of the method 700 are performed by agent prompt generation component 150 and parts of the method 700 are performed by response generation component 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, the processing device receives, via a conversational interface, user input from a user of an online system. For example, agent prompt generation component 150 receives user input 202 from user system 110 in response to a user of user system 110 interacting with conversational interface 205. Further details regarding receiving, via a conversational interface, user input from a user of an online system are described with reference to FIG. 2.

At operation 710, the processing device generates a user input embedding for the user input. For example, generation component 235 generates user input embedding 204 using user input 202. Further details regarding generating a user input embedding for the user input are described with reference to FIG. 2.

At operation 715, the processing device retrieves a vector store including tool description embeddings. For example, agent prompt generation component 150 retrieves tool description embeddings 227 from vector store 225. Further details regarding retrieving a vector store including tool description embeddings are described with reference to FIG. 2.

At operation 720, the processing device performs a similarity search using the user input embedding and the tool description embeddings. For example, searching component 245 performs a similarity search using user input embedding 204 and tool description embeddings 227. Further details regarding performing a similarity search using the user input embedding and the tool description embeddings are described with reference to FIG. 2.

At operation 725, the processing device determines a set of tool descriptions using the results of the similarity search. For example, agent prompt generation component 150 determines set of tool description embeddings 206 using the results of the similarity search performed by searching component 245. Further details regarding determining a set of tool descriptions using the results of the similarity search are described with reference to FIG. 2.

At operation 730, the processing device generates a prompt using the set of tool descriptions and the user input. For example, agent prompt generation component 150 generates agent prompt 208 using user input embedding 204 and set of tool description embeddings 206. Further details regarding generating a prompt using the set of tool descriptions and the user input are described with reference to FIG. 2.

At operation 735, the processing device applies machine learning agents to the prompt to cause the machine learning agents to use the tools associated with the set of tool descriptions. For example, agent prompt generation component 150 applies agents 210, 212, and 214 of agent management component 255 to agent prompt 208 to cause agents 210, 212, and 214 for use tools in tool implementations 265 identified by set of tool description embeddings 206. Further details regarding applying machine learning agents to the prompt are described with reference to FIGS. 2-5.

At operation 740, the processing device receives a response to the prompt from the machine learning agents. For example, response generation component 160 receives a response to the prompt from agent management component 255 based on agents 210, 212, and 214 implementing tools of tool implementations 265. Further details regarding receiving a response to the prompt from the machine learning agents are described with reference to FIGS. 2-5.

At operation 745, the processing device generates an output for the user input using the response to the prompt. For example, response generation component 160 generates response to user input 226 (e.g., output) using the response to the prompt received from agent management component 255. Further details regarding generating a response to the user input are described with reference to FIGS. 2-5.

At operation 750, the processing device sends the output to the user of the online system via the conversational interface. For example, response generation component 160 sends response to user input 226 to user system 110. Further details regarding sending the user input to the user of the online system via the conversational interface are described with reference to FIGS. 2-5.

Figure 8:
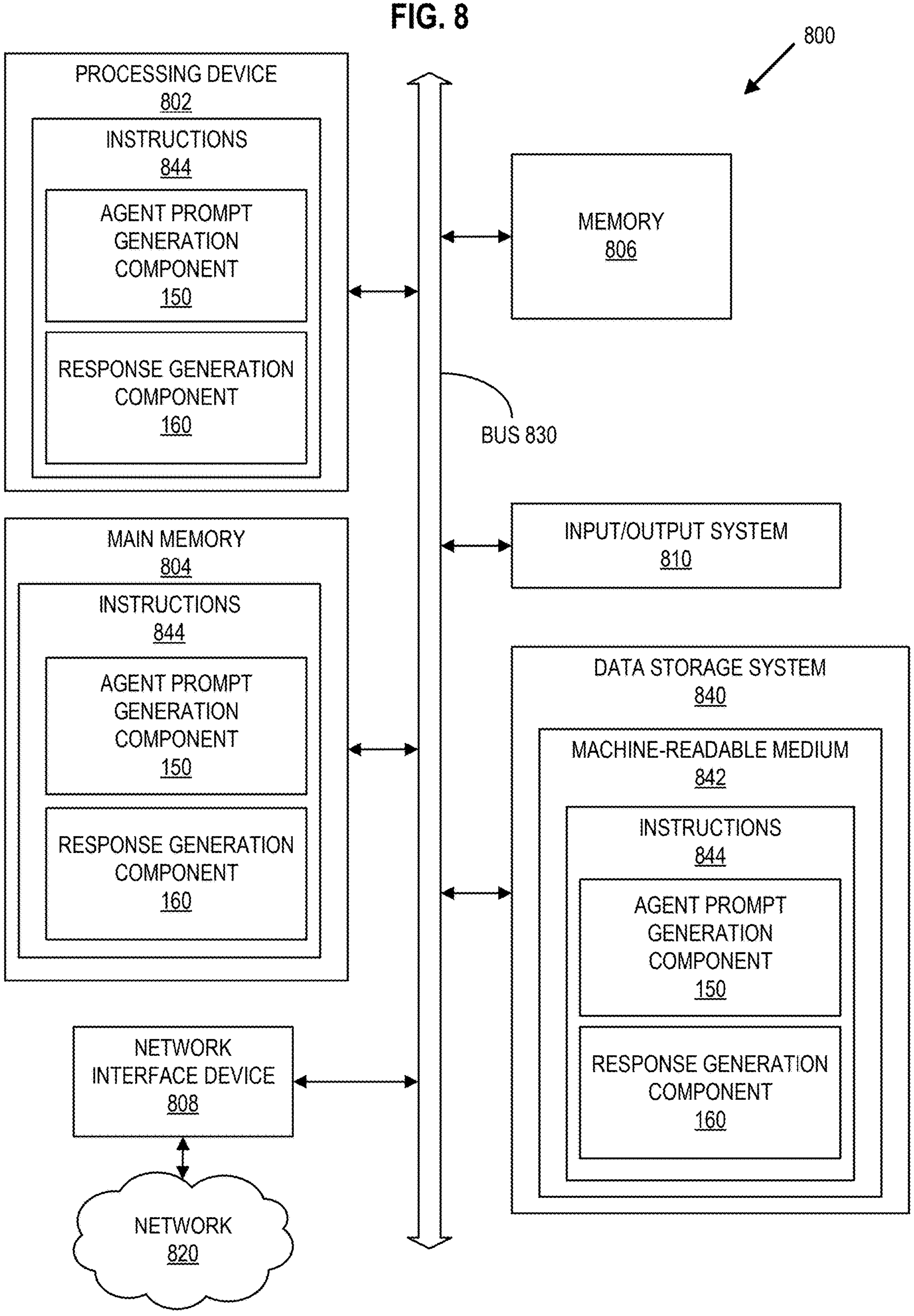
FIG. 8 is a block diagram of an example computer system in which embodiments of the present disclosure can operate.

FIG. 8 illustrates an example machine of a computer system 800 within which a set of instructions for causing the machine to perform any one or more of the methodologies discussed herein, can be executed. In some embodiments, the computer system 800 can correspond to a component of a networked computer system (e.g., computing system 100 of FIG. 1) that includes, is coupled to, or utilizes a machine to execute an operating system to perform operations corresponding to agent prompt generation component 150 and/or response generation component 160 of FIG. 1. In some embodiments, the techniques described herein can be performed by machine learning models such as large language models stored on local servers, the cloud, a client device, and/or some combination of these. For example, computer system 800 can include machine learning models such as a large language model stored on one or more of memory 806, main memory 804, data storage system 840, cloud servers, and/or client devices (e.g., user system 110 of FIG. 1) accessible through bus 830 and/or network 820. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random-access memory (DRAM) such as synchronous DRAM (SDRAM) or Rambus DRAM (RDRAM), etc.), a memory 806 (e.g., flash memory, static random-access memory (SRAM), etc.), an input/output system 810, and a data storage system 840, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 844 for performing the operations and steps discussed herein. The computer system 800 can further include a network interface device 808 to communicate over the network 820. Network interface device 808 can provide a two-way data communication coupling to a network. For example, network interface device 808 can be an integrated-services digital network (ISDN) card, cable modem, satellite modem, or a modem to provide a data communication connection to a corresponding type of telephone line. As another example, network interface device 808 can be a local area network (LAN) card to provide a data communication connection to a compatible LAN. Wireless links can also be implemented. In any such implementation, network interface device 808 can send and receive electrical, electromagnetic or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic or optical signals that carry digital data to and from computer system computer system 800.

Computer system 800 can send messages and receive data, including program code, through the network(s) and network interface device 808. In the Internet example, a server can transmit a requested code for an application program through the Internet and network interface device 808. The received code can be executed by processing device 802 as it is received, and/or stored in data storage system 840, or other non-volatile storage for later execution.

The input/output system 810 can include an output device, such as a display, for example a liquid crystal display (LCD) or a touchscreen display, for displaying information to a computer user, or a speaker, a haptic device, or another form of output device. The input/output system 810 can include an input device, for example, alphanumeric keys and other keys configured for communicating information and command selections to processing device 802. An input device can, alternatively or in addition, include a cursor control, such as a mouse, a trackball, or cursor direction keys for communicating direction information and command selections to processing device 802 and for controlling cursor movement on a display. An input device can, alternatively or in addition, include a microphone, a sensor, or an array of sensors, for communicating sensed information to processing device 802. Sensed information can include voice commands, audio signals, geographic location information, and/or digital imagery, for example.

The data storage system 840 can include a machine-readable storage medium 842 (also known as a computer-readable medium) on which is stored one or more sets of instructions 844 or software embodying any one or more of the methodologies or functions described herein. The instructions 844 can also reside, completely or at least partially, within the main memory 804 and/or within the processing device 802 during execution thereof by the computer system 800, the main memory 804 and the processing device 802 also constituting machine-readable storage media.

Clause 1. A method comprising: receiving, via a conversational interface, user input from a user of an online system; generating a user input embedding using the user input; retrieving a vector store comprising a plurality of tool description embeddings; performing a similarity search using the user input embedding and the plurality of tool description embeddings; determining a set of tool descriptions using the similarity search; generating a prompt using the set of tool descriptions and the user input; and applying one or more machine learning agents to the prompt to cause the one or more machine learning agents to use one or more tools associated with the set of tool descriptions; receiving a response to the prompt, from the one or more machine learning agents, in response to the machine learning agents using the one or more tools; and sending, via the conversational interface, an output to the user input based on the response.

Clause 2. The method of clause 1, wherein the set of tool descriptions comprise an administrator communication tool description for interacting with an administrator system and wherein applying the one or more machine learning agents to the prompt causes the one or more machine learning agents to use an administrator communication tool associated with the administrator communication tool description by causing the one or more machine learning agents to: generate a question for an administrator system using the prompt; send the question to the administrator system;

receive a reply from the administrator system; and generate the output using the reply from the administrator system.

Clause 3. The method of clause 2, further comprising: evaluating the set of tool descriptions, wherein generating the question for an administrator system using the prompt is in response to evaluating the set of tool descriptions.

Clause 4. The method of any of clauses 1-3, wherein the user input embedding includes metadata for the user of the online system and wherein each of the plurality of tool description embeddings includes tool description metadata, the method further comprising: comparing metadata of the user input embedding with tool description metadata for the plurality of tool description embeddings, wherein determining the set of tool descriptions further uses the metadata comparison.

Clause 5. The method of any of clauses 1-4, further comprising: generating a status update based on the one or more machine learning agents using the one or more tools; and sending, via the conversational interface, to the user of the online system, the status update.

Clause 6. The method of any of clauses 1-5, wherein the set of tool descriptions comprise a code generation tool description for generating application programming interface code and wherein applying the one or more machine learning agents to the prompt causes the one or more machine learning agents to use a code generation tool associated with the code generation tool description by causing the one or more machine learning agents to: generate code to access an application programming interface; and generating the output by using the generated code to access the application programming interface.

Clause 7. The method of any of clauses 1-6, wherein the set of tool descriptions comprise a tool description editing tool description for editing tool descriptions of the plurality of tool description embeddings and wherein applying the one or more machine learning agents to the prompt causes the one or more machine learning agents to use a tool description editing tool associated with the tool description editing tool description by causing the one or more machine learning agents to: evaluate the output; edit a tool description of the plurality of tool description embeddings in response to the evaluation; and regenerate the output using the edited tool description.

Clause 8. A non-transitory computer-readable storage medium comprising instructions that, when executed by a processing device, cause the processing device to: receive, via a conversational interface, user input from a user of an online system; generate a user input embedding using the user input; retrieve a vector store comprising a plurality of tool description embeddings; perform a similarity search using the user input embedding and the plurality of tool description embeddings; determine a set of tool descriptions using the similarity search; generate a prompt using the set of tool descriptions and the user input; and apply one or more machine learning agents to the prompt to cause the one or more machine learning agents to use one or more tools associated with the set of tool descriptions; receive a response to the prompt, from the one or more machine learning agents, in response to the machine learning agents using the one or more tools; and send, via the conversational interface, an output to the user input based on the response.

Clause 9. The non-transitory computer-readable storage medium of clause 8, wherein the set of tool descriptions comprise an administrator communication tool description for interacting with an administrator system and wherein applying the one or more machine learning agents to the prompt causes the one or more machine learning agents to use an administrator communication tool associated with the administrator communication tool description by causing the one or more machine learning agents to: generate a question for an administrator system using the prompt; send the question to the administrator system; receive a reply from the administrator system; and generate the output using the reply from the administrator system.

Clause 10. The non-transitory computer-readable storage medium of clause 9, wherein the processing device is further to: evaluate the set of tool descriptions, wherein generating the question for an administrator system using the prompt is in response to evaluating the set of tool descriptions.

Clause 11. The non-transitory computer-readable storage medium of any of clauses 8-10, wherein the user input embedding includes metadata for the user of the online system, wherein each of the plurality of tool description embeddings includes tool description metadata, and wherein the processing device is further to: compare metadata of the user input embedding with tool description metadata for the plurality of tool description embeddings, wherein determining the set of tool descriptions further uses the metadata comparison.

Clause 12. The non-transitory computer-readable storage medium of any of clauses 8-11, wherein the processing device is further to: generate a status update based on the one or more machine learning agents using the one or more tools; and send, via the conversational interface, to the user of the online system, the status update.

Clause 13. The non-transitory computer-readable storage medium of any of clauses 8-12, wherein the set of tool descriptions comprise a code generation tool description for generating application programming interface code and wherein applying the one or more machine learning agents to the prompt causes the one or more machine learning agents to use a code generation tool associated with the code generation tool description by causing the one or more machine learning agents to: generate code to access an application programming interface; and generating the output by using the generated code to access the application programming interface.

Clause 14. The non-transitory computer-readable storage medium of any of clauses 8-13, wherein the set of tool descriptions comprise a tool description editing tool description for editing tool descriptions of the plurality of tool description embeddings and wherein applying the one or more machine learning agents to the prompt causes the one or more machine learning agents to use a tool description editing tool associated with the tool description editing tool description by causing the one or more machine learning agents to: evaluate the output; edit a tool description of the plurality of tool description embeddings in response to the evaluation; and regenerate the output using the edited tool description.

Clause 15. A system, comprising: at least one processing device; and at least one memory coupled to the at least one processing device, wherein the at least one memory comprises instructions that, when executed by the at least one processing device, cause the at least one processing device to: receive, via a conversational interface, user input from a user of an online system; generate a user input embedding using the user input, wherein the user input embedding includes metadata for the user of the online system; retrieve a vector store comprising a plurality of tool description embeddings, wherein each of the plurality of tool description embeddings includes tool description metadata; perform a similarity search using the user input embedding and the plurality of tool description embeddings; compare metadata of the user input embedding with tool description metadata for the plurality of tool description embeddings; determine a set of tool descriptions using the similarity search and the metadata comparison; generate a prompt using the set of tool descriptions and the user input; and apply one or more machine learning agents to the prompt to cause the one or more machine learning agents to use one or more tools associated with the set of tool descriptions; receive a response to the prompt, from the one or more machine learning agents, in response to the machine learning agents using the one or more tools; and send, via the conversational interface, an output to the user input based on the response.

Clause 16. The system of clause 15, wherein the set of tool descriptions comprise an administrator communication tool description for interacting with an administrator system and wherein applying the one or more machine learning agents to the prompt causes the one or more machine learning agents to use an administrator communication tool associated with the administrator communication tool description by causing the one or more machine learning agents to: generate a question for an administrator system using the prompt; send the question to the administrator system; receive a reply from the administrator system; and generate the output using the reply from the administrator system.

Clause 17. The system of clause 16, wherein the processing device is further to: evaluate the set of tool descriptions, wherein generating the question for an administrator system using the prompt is in response to evaluating the set of tool descriptions.

Clause 18. The system of any of clauses 15-17, wherein the processing device is further to: generate a status update based on the one or more machine learning agents using the one or more tools; and send, via the conversational interface, to the user of the online system, the status update.

Clause 19. The system of any of clauses 15-18, wherein the set of tool descriptions comprise a code generation tool description for generating application programming interface code and wherein applying the one or more machine learning agents to the prompt causes the one or more machine learning agents to use a code generation tool associated with the code generation tool description by causing the one or more machine learning agents to: generate code to access an application programming interface; and generating the output by using the generated code to access the application programming interface.

Clause 20. The system of any of clauses 15-19, wherein the set of tool descriptions comprise a tool description editing tool description for editing tool descriptions of the plurality of tool description embeddings and wherein applying the one or more machine learning agents to the prompt causes the one or more machine learning agents to use a tool description editing tool associated with the tool description editing tool description by causing the one or more machine learning agents to: evaluate the output; edit a tool description of the plurality of tool description embeddings in response to the evaluation; and regenerate the output using the edited tool description.

In one embodiment, the instructions 844 include instructions to implement functionality corresponding to an agent prompt generation component (e.g., agent prompt generation component 150 of FIG. 1). In another embodiment, the instructions 844 include instructions to implement functionality corresponding to a response generation component (e.g., response generation component 160 of FIG. 1). In yet another embodiment, the instructions 844 include instructions to implement functionality corresponding to both an agent prompt generation component and a response generation component (e.g., agent prompt generation component 150 and response generation component 160 of FIG. 1). While the machine-readable storage medium 842 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may choose to share personal data with different platforms to provide services that are more tailored to the users. In instances where the users choose not to share personal data with the platforms, the choices made by the users will not have any impact on their ability to use the services that they had access to prior to making their choice. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented method 700 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

receiving, via a conversational interface, user input from a user of an online system;

generating a user input embedding using the user input;

retrieving a vector store comprising a plurality of tool description embeddings;

performing a similarity search using the user input embedding and the plurality of tool description embeddings;

determining a set of tool descriptions using the similarity search;

generating a prompt using the set of tool descriptions and the user input; and applying one or more machine learning agents to the prompt to cause the one or more machine learning agents to use one or more tools associated with the set of tool descriptions by accessing an application programming interface for the one or more tools;

receiving a response to the prompt, from the one or more machine learning agents, in response to the machine learning agents using the one or more tools; and sending, via the conversational interface, an output to the user input based on the response.

2. The method of claim 1, wherein the user input embedding includes metadata for the user of the online system and wherein each of the plurality of tool description embeddings includes tool description metadata, the method further comprising:

comparing metadata of the user input embedding with tool description metadata for the plurality of tool description embeddings, wherein determining the set of tool descriptions further uses the metadata comparison.

3. The method of claim 1, further comprising:

generating a status update based on the one or more machine learning agents using the one or more tools; and sending, via the conversational interface, to the user of the online system, the status update.

4. A method comprising:

receiving, via a conversational interface, user input from a user of an online system;

generating a user input embedding using the user input;

retrieving a vector store comprising a plurality of tool description embeddings;

performing a similarity search using the user input embedding and the plurality of tool description embeddings;

determining a set of tool descriptions using the similarity search, wherein the set of tool descriptions comprise an administrator communication tool description for interacting with an administrator system;

generating a prompt using the set of tool descriptions and the user input;

applying one or more machine learning agents to the prompt to cause the one or more machine learning agents to use an administrator communication tool associated with the administrator communication tool description by causing the one or more machine learning agents to:

generate a question for an administrator system using the prompt;

send the question to the administrator system;

receive a reply from the administrator system; and generate an output using the reply from the administrator system;

receiving a response to the prompt, from the one or more machine learning agents, in response to the machine learning agents using the one or more tools; and sending, via the conversational interface, an output to the user input based on the response.

5. The method of claim 4, further comprising:

evaluating the set of tool descriptions, wherein generating the question for an administrator system using the prompt is in response to evaluating the set of tool descriptions.

6. A method comprising:

receiving, via a conversational interface, user input from a user of an online system;

generating a user input embedding using the user input;

retrieving a vector store comprising a plurality of tool description embeddings;

performing a similarity search using the user input embedding and the plurality of tool description embeddings;

determining a set of tool descriptions using the similarity search, wherein the set of tool descriptions comprise a code generation tool description for generating application programming interface code;

generating a prompt using the set of tool descriptions and the user input;

applying one or more machine learning agents to the prompt to cause the one or more machine learning agents to use a code generation tool associated with the code generation tool description by causing the one or more machine learning agents to:

generate code to access an application programming interface; and generate an output by using the generated code to access the application programming interface;

receiving a response to the prompt, from the one or more machine learning agents, in response to the machine learning agents using the one or more tools; and sending, via the conversational interface, the output to the user input based on the response.

7. A method comprising:

receiving, via a conversational interface, user input from a user of an online system;

generating a user input embedding using the user input;

retrieving a vector store comprising a plurality of tool description embeddings;

performing a similarity search using the user input embedding and the plurality of tool description embeddings;

determining a set of tool descriptions using the similarity search, wherein the set of tool descriptions comprise a tool description editing tool description for editing tool descriptions of the plurality of tool description embeddings;

generating a prompt using the set of tool descriptions and the user input;

applying one or more machine learning agents to the prompt to cause the one or more machine learning agents to use a tool description editing tool associated with the tool description editing tool description by causing the one or more machine learning agents to:

evaluate an output;

edit a tool description of the plurality of tool description embeddings in response to the evaluation; and regenerate the output using the edited tool description;

receiving a response to the prompt, from the one or more machine learning agents, in response to the machine learning agents using the one or more tools; and sending, via the conversational interface, the regenerated output to the user input based on the response.

8. A non-transitory computer-readable storage medium comprising instructions that, when executed by a processing device, cause the processing device to:

receive, via a conversational interface, user input from a user of an online system;

generate a user input embedding using the user input;

retrieve a vector store comprising a plurality of tool description embeddings;

perform a similarity search using the user input embedding and the plurality of tool description embeddings;

determine a set of tool descriptions using the similarity search;

generate a prompt using the set of tool descriptions and the user input; and apply one or more machine learning agents to the prompt to cause the one or more machine learning agents to use one or more tools associated with the set of tool descriptions by accessing an application programming interface for the one or more tools;

receive a response to the prompt, from the one or more machine learning agents, in response to the machine learning agents using the one or more tools; and send, via the conversational interface, an output to the user input based on the response.

9. The non-transitory computer-readable storage medium of claim 8, wherein the user input embedding includes metadata for the user of the online system, wherein each of the plurality of tool description embeddings includes tool description metadata, and wherein the processing device is further to:

compare metadata of the user input embedding with tool description metadata for the plurality of tool description embeddings, wherein determining the set of tool descriptions further uses the metadata comparison.

10. The non-transitory computer-readable storage medium of claim 8, wherein the processing device is further to:

generate a status update based on the one or more machine learning agents using the one or more tools; and send, via the conversational interface, to the user of the online system, the status update.

11. A non-transitory computer-readable storage medium comprising instructions that, when executed by a processing device, cause the processing device to:

receive, via a conversational interface, user input from a user of an online system;

generate a user input embedding using the user input;

retrieve a vector store comprising a plurality of tool description embeddings;

perform a similarity search using the user input embedding and the plurality of tool description embeddings;

determine a set of tool descriptions using the similarity search, wherein the set of tool descriptions comprise an administrator communication tool description for interacting with an administrator system;

generate a prompt using the set of tool descriptions and the user input;

apply one or more machine learning agents to the prompt to cause the one or more machine learning agents to use an administrator communication tool associated with the administrator communication tool description by causing the one or more machine learning agents to:

generate a question for an administrator system using the prompt;

send the question to the administrator system;

receive a reply from the administrator system; and generate an output using the reply from the administrator system;

receive a response to the prompt, from the one or more machine learning agents, in response to the machine learning agents using the one or more tools; and send, via the conversational interface, an output to the user input based on the response.

12. The non-transitory computer-readable storage medium of claim 11, wherein the processing device is further to:

evaluate the set of tool descriptions, wherein generating the question for an administrator system using the prompt is in response to evaluating the set of tool descriptions.

13. A non-transitory computer-readable storage medium comprising instructions that, when executed by a processing device, cause the processing device to:

receive, via a conversational interface, user input from a user of an online system;

generate a user input embedding using the user input;

retrieve a vector store comprising a plurality of tool description embeddings;

perform a similarity search using the user input embedding and the plurality of tool description embeddings;

determine a set of tool descriptions using the similarity search, wherein the set of tool descriptions comprise a code generation tool description for generating application programming interface code;

generate a prompt using the set of tool descriptions and the user input;

apply one or more machine learning agents to the prompt to cause the one or more machine learning agents to use a code generation tool associated with the code generation tool description by causing the one or more machine learning agents to:

generate code to access an application programming interface; and generate an output by using the generated code to access the application programming interface;

receive a response to the prompt, from the one or more machine learning agents, in response to the machine learning agents using the one or more tools; and send, via the conversational interface, the output to the user input based on the response.

14. A non-transitory computer-readable storage medium comprising instructions that, when executed by a processing device, cause the processing device to:

receive, via a conversational interface, user input from a user of an online system;

generate a user input embedding using the user input;

retrieve a vector store comprising a plurality of tool description embeddings;

perform a similarity search using the user input embedding and the plurality of tool description embeddings;

determine a set of tool descriptions using the similarity search, wherein the set of tool descriptions comprise a tool description editing tool description for editing tool descriptions of the plurality of tool description embeddings;

generate a prompt using the set of tool descriptions and the user input;

apply one or more machine learning agents to the prompt to cause the one or more machine learning agents to use a tool description editing tool associated with the tool description editing tool description by causing the one or more machine learning agents to:

evaluate an output;

edit a tool description of the plurality of tool description embeddings in response to the evaluation; and regenerate the output using the edited tool description;

receive a response to the prompt, from the one or more machine learning agents, in response to the machine learning agents using the one or more tools; and send, via the conversational interface, the regenerated output to the user input based on the response.

15. A system, comprising:

at least one processing device; and at least one memory coupled to the at least one processing device, wherein the at least one memory comprises instructions that, when executed by the at least one processing device, cause the at least one processing device to:

receive, via a conversational interface, user input from a user of an online system;

generate a user input embedding using the user input, wherein the user input embedding includes metadata for the user of the online system;

retrieve a vector store comprising a plurality of tool description embeddings, wherein each of the plurality of tool description embeddings includes tool description metadata;

perform a similarity search using the user input embedding and the plurality of tool description embeddings;

compare metadata of the user input embedding with tool description metadata for the plurality of tool description embeddings;

determine a set of tool descriptions using the similarity search and the metadata comparison;

generate a prompt using the set of tool descriptions and the user input; and apply one or more machine learning agents to the prompt to cause the one or more machine learning agents to use one or more tools associated with the set of tool descriptions by accessing an application programming interface for the one or more tools;

receive a response to the prompt, from the one or more machine learning agents, in response to the machine learning agents using the one or more tools; and send, via the conversational interface, an output to the user input based on the response.

16. The system of claim 15, wherein the processing device is further to:

generate a status update based on the one or more machine learning agents using the one or more tools; and send, via the conversational interface, to the user of the online system, the status update.

17. A system comprising:

at least one processing device; and at least one memory coupled to the at least one processing device, wherein the at least one memory comprises instructions that, when executed by the at least one processing device, cause the at least one processing device to:

receive, via a conversational interface, user input from a user of an online system;

generate a user input embedding using the user input;

retrieve a vector store comprising a plurality of tool description embeddings;

perform a similarity search using the user input embedding and the plurality of tool description embeddings;

determine a set of tool descriptions using the similarity search, wherein the set of tool descriptions comprise an administrator communication tool description for interacting with an administrator system;

generate a prompt using the set of tool descriptions and the user input;

apply one or more machine learning agents to the prompt to cause the one or more machine learning agents to use an administrator communication tool associated with the administrator communication tool description by causing the one or more machine learning agents to:

generate a question for an administrator system using the prompt;

send the question to the administrator system;

receive a reply from the administrator system; and generate an output using the reply from the administrator system;

receive a response to the prompt, from the one or more machine learning agents, in response to the machine learning agents using the one or more tools; and send, via the conversational interface, an output to the user input based on the response.

18. The system of claim 17, wherein the processing device is further to:

evaluate the set of tool descriptions, wherein generating the question for an administrator system using the prompt is in response to evaluating the set of tool descriptions.

19. A system comprising:

at least one processing device; and at least one memory coupled to the at least one processing device, wherein the at least one memory comprises instructions that, when executed by the at least one processing device, cause the at least one processing device to:

receive, via a conversational interface, user input from a user of an online system;

generate a user input embedding using the user input;

retrieve a vector store comprising a plurality of tool description embeddings;

perform a similarity search using the user input embedding and the plurality of tool description embeddings;

determine a set of tool descriptions using the similarity search, wherein the set of tool descriptions comprise a code generation tool description for generating application programming interface code;

generate a prompt using the set of tool descriptions and the user input;

apply one or more machine learning agents to the prompt to cause the one or more machine learning agents to use a code generation tool associated with the code generation tool description by causing the one or more machine learning agents to:

generate code to access an application programming interface; and generate an output by using the generated code to access the application programming interface;

receive a response to the prompt, from the one or more machine learning agents, in response to the machine learning agents using the one or more tools; and send, via the conversational interface, the output to the user input based on the response.

20. A system comprising:

at least one processing device; and at least one memory coupled to the at least one processing device, wherein the at least one memory comprises instructions that, when executed by the at least one processing device, cause the at least one processing device to:

receive, via a conversational interface, user input from a user of an online system;

generate a user input embedding using the user input;

retrieve a vector store comprising a plurality of tool description embeddings;

perform a similarity search using the user input embedding and the plurality of tool description embeddings;

determine a set of tool descriptions using the similarity search, wherein the set of tool descriptions comprise a tool description editing tool description for editing tool descriptions of the plurality of tool description embeddings;

generate a prompt using the set of tool descriptions and the user input;

apply one or more machine learning agents to the prompt to cause the one or more machine learning agents to use a tool description editing tool associated with the tool description editing tool description by causing the one or more machine learning agents to:

evaluate an output;

edit a tool description of the plurality of tool description embeddings in response to the evaluation; and regenerate the output using the edited tool description;

receive a response to the prompt, from the one or more machine learning agents, in response to the machine learning agents using the one or more tools; and send, via the conversational interface, the regenerated output to the user input based on the response.

* * * * *